United States Patent

[11] 3,609,219

[72] Inventor Max H. Diehl
Manlius, N.Y.

[21] Appl. No. 4,901
[22] Filed Jan. 22, 1970
[45] Patented Sept. 28, 1971
[73] Assignee General Electric Company

[54] SYSTEM FOR REGULATION OF COLOR TELEVISION CAMERA SIZE AND CENTERING CURRENTS
12 Claims, 2 Drawing Figs.

[52] U.S. Cl. 178/5.4, 315/27
[51] Int. Cl. H04n 5/44
[50] Field of Search 178/5.4 M; 315/9, 27

[56] References Cited
UNITED STATES PATENTS
2,654,854 10/1953 Seright 315/9
2,753,451 7/1956 Cetrone 328/179
3,404,220 10/1968 Favreau 178/5.4 MX

*Primary Examiner*—Rodney D. Bennett, Jr.
*Assistant Examiner*—H. A. Birmiel
*Attorneys*—Marvin Snyder, W. J. Shanley, Jr., Frank L. Neuhauser, Oscar B. Waddell and James B. Forman

ABSTRACT: Long-term registration stability in multiple tube television color cameras is improved by minimizing differential changes in sweep size and centering. A comparison of the average and peak-to-peak amplitudes of current in the deflection coils of one tube to the average and peak-to-peak amplitudes of current in the deflection coils of the second tube in a two-tube color camera, or to the average and peak-to-peak amplitudes of current in the deflection coils of the second and third tubes in a three-tube color camera, is made, and DC error voltages for size and centering are derived and applied to the sweep circuitry in a manner to minimize drift.

INVENTOR:
MAX H. DIEHL,

BY Marvin Snyder
HIS ATTORNEY.

INVENTOR:
MAX H. DIEHL,

BY Marvin Snyder
HIS ATTORNEY

SYSTEM FOR REGULATION OF COLOR TELEVISION CAMERA SIZE AND CENTERING CURRENTS

This invention relates to color television camera registration stability, and more particularly to a method and apparatus for improving long-term registration stability in multiple tube color television cameras.

An important consideration in design of multiple tube television color cameras is maintenance of long-term registration stability. That is, the image viewed by any one of the camera pickup tubes must coincide, to a high degree of accuracy, with the image viewed by every one of the other camera pickup tubes in order to transmit color images of high definition. Two of the factors upon which proper registration depends are sweep size and centering, in both the horizontal and vertical directions. The present invention is concerned with maintaining for an indefinite duration, in each of the camera pickup tubes, substantially identical sweep sizes and image centering.

Briefly, in accordance with a preferred embodiment of the invention, apparatus for maintaining long-term registration stability of images in a multiple tube color television camera, each tube including apparatus for centering detected images and adjusting size thereof, comprises means coupled to each tube for sensing current in the apparatus for centering and adjusting size of detected images, and gain control means for controlling peak-to-peak amplitude of current in the apparatus for centering and adjusting size of detected images in a first one of the tubes. First comparison means responsive to average amplitude of current in the apparatus in each tube are provided for producing a DC signal to be added to the current in the apparatus for centering and adjusting size of detected images in the first tube so as to position detected images in the first tube at a predetermined location with respect to detected images in a second one of the tubes. Second comparison means responsive to peak-to-peak amplitude of current in the apparatus in each tube for centering and adjusting size of detected images are provided for supplying a correction signal to the gain control means for controlling peak-to-peak amplitude of current in the first tube so as to adjust size of detected images in the first tube according to size of detected images in the first tube according to size of detected images in the second tube.

In accordance with another preferred embodiment of the invention, a method of maintaining long-term registration stability in a multiple tube color television camera, each tube-receiving ramp waveform deflection currents for deflecting an electron beam therein substantially in mutually perpendicular directions, comprises comparing the deflection currents deflecting the electron beam in each of a pair of the tubes in at least one of the directions to produce a first error voltage of amplitude dependent upon the difference in average amplitude of each of the currents, and a second error voltage of amplitude dependent upon the difference in peak-to-peak amplitudes of each of the currents. The deflection current in one tube of the pair is corrected in accordance with the first and second error voltages, respectively, so as to maintain each of the average and peak-to-peak amplitudes of the deflection current in the one tube at a substantially constant relation with respect to the average and peak-to-peak amplitudes of the deflection current, respectively, in another one of the pair of tubes.

Accordingly, one object of the invention is to provide a method and apparatus for improving long-term registration stability in television color cameras.

Another object is to provide a method and apparatus for maintaining images produced by the pickup tubes in a color television camera substantially centered upon each other and substantially of identical size.

Another object is to provide a multiple tube television color camera in which differential changes in sweep size and centering are minimized.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
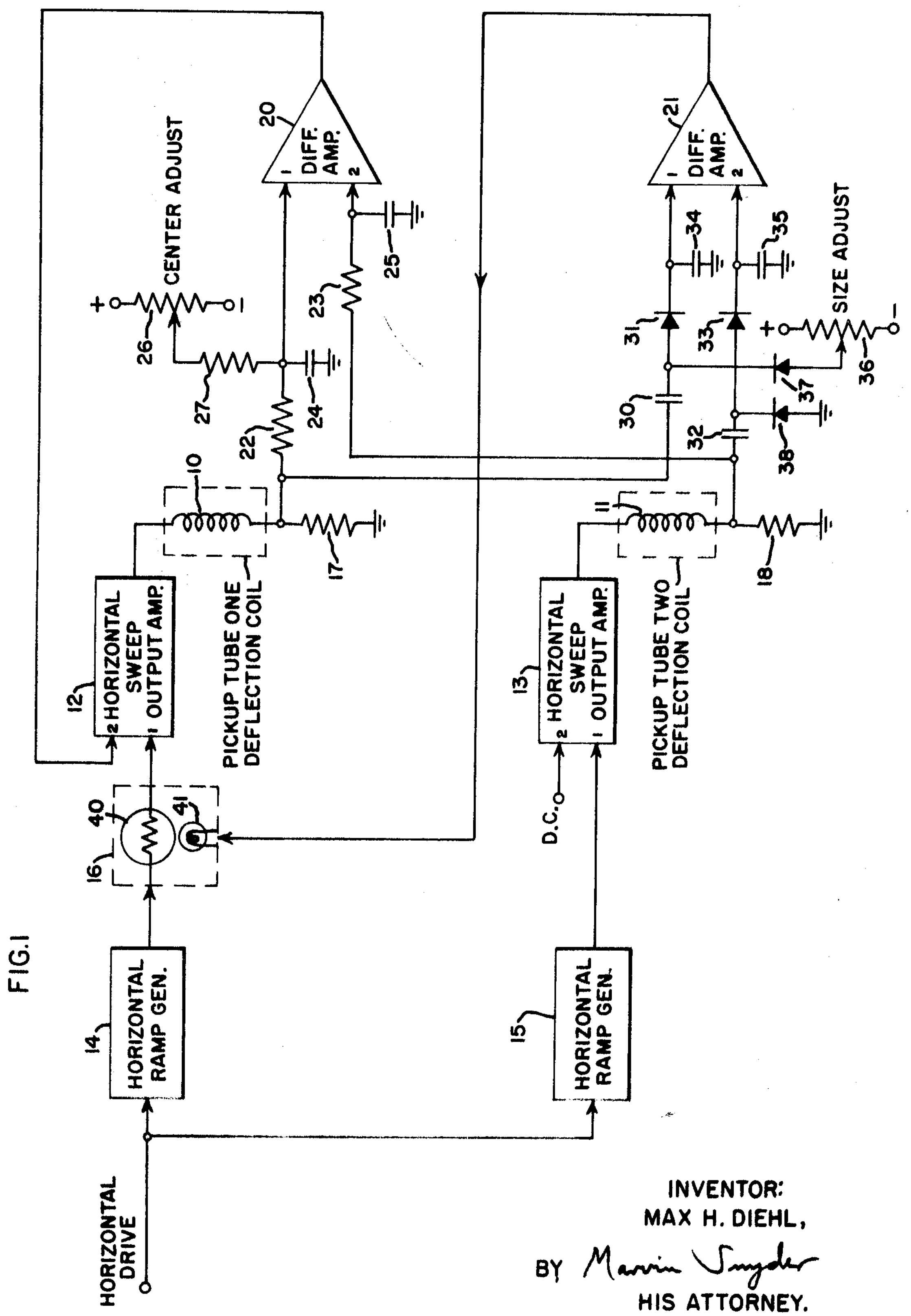
FIG. 1 is a schematic diagram of apparatus embodying the present invention in a two-tube color camera.

In FIG. 1, the horizontal deflection yoke coils 10 and 11 of each respective tube in a two-tube color camera are illustrated, each driven by a horizontal sweep output amplifier 12 and 13 respectively, in conventional fashion. That is, each of horizontal sweep output amplifiers 12 and 13 is driven at a first input by an AC sawtooth wave produced by horizontal generators 14 and 15, respectively, with a gain control element 16 interposed between horizontal ramp generator 14 and horizontal sweep output amplifier 12. Preferably, gain control element 16 comprises the resistance of a photoconductive cell 40 which is varied in accordance with light produced by a lamp 41, the intensity of which is controlled by the output signal of a differential amplifier 21. Photoconductive cell 40 couples the output of horizontal ramp generator 14 to the first input of horizontal sweep output amplifier 12. Horizontal ramp generators 14 and 15 are triggered synchronously by a common horizontal drive signal.

Each of coils 10 and 11 is connected to one side of a resistance 17 and 18, respectively. These resistances are highly stable, preferably with variations of only one part per million per degree centigrade. Such resistances typically may comprise one-half watt precision resistors, type S-104, available from Vishay Instruments, Inc., Malvern, Pa. The opposite side of each of resistances 17 and 18 is grounded, enabling currents in yoke coils 10 and 11 to be sampled across resistances 17 and 18, respectively.

One input of a differential amplifier 20 is DC coupled through a resistance 22 to the junction of coil 10 and resistance 17, and coupled to ground through a capacitance 24, while the second input of differential amplifier 20 is DC coupled through a resistance 23 to the junction of coil 11 and resistance 18, and coupled to ground through a capacitance 25. AC voltages resulting from flow of alternating current in coils 10 and 11 through resistances 17 and 18, respectively, are filtered out of the first input to amplifier 20 by the R-C filter comprising resistance 22 and capacitance 24, and are filtered out of the second input to amplifier 20 by the R-C filter comprising resistance 23 and capacitance 25. The R-C time constants of resistance 22 and capacitance 24, and resistance 23 and capacitance 25, are each at least two orders of magnitude greater than the period of the ramp signals generated by horizontal ramp generators 14 and 15, respectively. A nominal horizontal centering value for the first camera pickup tube is set by adjustment of a DC energized potentiometer 26, the variable tap of which is coupled through a current limiting resistance 27 to the first input of differential amplifier 20, while the output of differential amplifier 20 is supplied to a second input of amplifier 12 in negative feedback fashion in order to maintain the DC component of the pickup tube one ramp signal at the desired centering value; that is, voltages supplied to the inputs of amplifier 12 are algebraically added, so that a single-resultant signal is amplified thereby. A predetermined bias is applied to the second input to horizontal sweep output amplifier 13 so as to maintain the DC component of the second camera pickup tube ramp signal at the desired centering value. Amplifiers 12 and 13 typically comprise Motorola operational amplifiers, type MC 1439G, available from Motorola, Inc., having offices in Franklin Park, Ill.

Output signals from the junction of yoke coil 10 of pickup tube one and resistance 17 are furnished to a first input of differential amplifier 21 through a series-connected capacitance 30 and diode 31. In similar fashion, output signals are furnished from the junction of yoke coil 11 of pickup tube two and resistance 18 to the second input of differential amplifier 21 through a series-connected capacitance 32 and diode 33. Each cathode of diodes 31 and 33 is coupled to ground through a capacitance 34 and 35, respectively. Capacitance 30, diodes 37 and 31, and capacitance 34 form a first voltage peak-to-peak detector, while capacitance 32, diodes 38 and 33, and capacitance 35 form a second voltage peak-to-peak detector. In addition, capacitances 30 and 32 serve to block any DC component of current flowing through yoke coils 10 and 11, respectively, from reaching the inputs of differential amplifier 21. The output of differential amplifier 21 furnishes a control signal to gain control element 16. Amplifiers 20 and 21 are preferably in the form of integrated circuits.

Image size adjustments for pickup tube one are obtained by supplying a DC voltage from a variable tap on a potentiometer 36 to the anode of diode 31 through diode 37. Diode 37 maintains voltage on the anode of diode 31 at a minimum amplitude corresponding to the amplitude of voltage supplied from the variable tap of potentiometer 36. In similar fashion, diode 38 coupled between the anode of diode 33 and ground serves to prevent the anode of diode 33 from ever being driven to a voltage significantly below ground potential. Image size adjustments for pickup tube two are made by manually adjusting the peak-to-peak amplitude of voltage produced by horizontal ramp generator 15 to the desired value.

In operation, deflection coil current of pickup tube one is compared to deflection-coil current of pickup tube two in order to derive DC error voltages for centering and size. Centering error voltages are applied to the input of pickup tube one sweep output amplifier 12 in a direction which tends to minimize the difference between average amplitude of coil current in each of the pickup tubes. Size error voltages are applied to pickup tube on gain control 16 in a direction which tends to minimize the difference in peak-to-peak amplitude of coil current in each of the tubes.

Centering differences are minimized by applying voltages caused by flow of yoke coil current in pickup tubes one and two, respectively, through resistances 17 and 18, respectively, to the first and second inputs of differential amplifier 20. With AC components of the ramp voltages across resistances 17 and 18 filtered out by the R-C filters comprising resistance 22 and capacitance 24, and resistance 23 and capacitance 25, respectively, the signals furnished to the first and second inputs of differential amplifier 20 are comprised only of the DC portions, if any, of the ramp voltage waveforms resulting from current produced by horizontal ramp generators 14 and 15, respectively. These voltage waveforms are highly accurate representations of the respective yoke coil currents from which they are derived due, in large measure, not only to the high degree of precision of resistances 17 and 18, but also to the fact that in each of amplifiers 20 and 21 the first and second input circuits thereof are formed on the same semiconductor chip, respectively, so that signal drift in the first and second input circuits of each of amplifiers 20 and 21 is matched.

In event the average amplitudes of current in coils 10 and 11 are equal, and the tap on potentiometer 26 is adjusted to provide zero voltage, differential amplifier 20 furnishes no output voltage to the second input of horizontal sweep output amplifier 12. On the other hand, if average current in coil 10 is more negative than that in coil 11 and the tap on potentiometer 26 remains set at zero voltage, the magnitude of voltage supplied to the first input of differential amplifier 20 is below that supplied to the second input of the amplifier. In this event, differential amplifier 20 furnishes a voltage of positive polarity to the second input of horizontal sweep output amplifier 12, with amplitude dependent upon the difference in amplitude of currents through coils 10 and 11. This voltage adds to the output signal of horizontal sweep output amplifier 12, increasing in a positive direction the average amplitude of the ramp voltage waveform furnished by amplifier 12 and thereby increasing in a positive direction the average amplitude of current flowing through coil 10. This serves to minimize the difference between center locations of images detected by pickup tubes one and two. On the other hand, in event the average current through coil 10 is more positive than that in coil 11, the DC error voltage produced by differential amplifier 20 reverses polarity and assumes an amplitude dependent upon the difference in amplitude of current flowing through coils 10 and 11. Differential amplifier 20 thus supplies a voltage of negative polarity to the second input of horizontal sweep output amplifier 12 and thereby increases in a negative direction the average amplitude of the ramp voltage waveform furnished by amplifier 12, increasing in a negative direction the average amplitude of current flowing through coil 10. Again, this serves to minimize the difference between center locations of images detected by camera pickup tubes one and two.

Amplitude of current flow through coil 11 may be manually adjusted by regulating the amplitude of DC voltage applied to the second input of horizontal sweep output amplifier 13. This adjustment once made, should require only infrequent readjustment. Manual adjustments are preferably made by setting the tap on potentiometer 26. By so doing, a DC voltage is added to the voltage at the first input of differential amplifier 20, bringing about a change in average amplitude of current flow through coil 10. In this fashion, average current in the yoke coils of each of camera pickup tubes one and two is adjusted so as to produce identical image centering for both tubes. By making the voltage gain of differential amplifier 20 relatively high (about 40,000), correction for miscentering of images produced by pickup tubes on one and two comes very close to being 100 percent. A typical differential amplifier useful as amplifier 20 comprises Raytheon operational amplifier, type RC 4131, available from Raytheon Co., having offices in Lexington, Mass.

Minimization of size differences depends on application of DC voltage proportional to the peak-to-peak ramp voltage furnished to pickup tubes one and two, to the first and second inputs, respectively, of differential amplifier 21. This is accomplished by supplying voltages proportional to the yoke coil currents in pickup tubes one and two, respectively, to the voltage peak-to-peak detectors connected to each input, respectively, of differential amplifier 21. Since a difference in peak-to-peak amplitude of the voltage waveforms generated by the camera yoke coil currents produces a difference in length of horizontal sweep, a difference in horizontal size of detected images results. Accordingly, the circuitry connected to the first and second inputs, respectively, of differential amplifier 21 functions to convert the ramp voltage waveforms resulting from flow of yoke coil current through each of resistances 17 and 18, respectively, to a substantially steady-state DC voltage of amplitude proportional to the peak-to-peak amplitude of the voltage from which it was produced.

Specifically, considering the voltage waveform configuration produced by flow of current from coil 11 of camera pickup tube two through resistance 18 as an example, a ramp voltage having an average amplitude at or close to zero appears across resistance 18. This ramp voltage waveform configuration is such that the junction common to resistance 18 and coil 11 initially drops sharply to a negative voltage, from which it begins to rise at a rate determinative of the velocity at which the electron beam in camera pickup tube two is swept horizontally. Forward current flow through diode 38 is thus initiated and, since the forward resistance presented by diode 38 is very small, the R-C time constant of capacitance 32 and the resistance of diode 38 is very small, so the capacitance 32 almost immediately charges to a voltage substantially equal to the instantaneous negative voltage at the junction common to resistance 18 and coil 11.

As voltage across resistance 18 rises in a positive direction, diode 38 becomes reverse--biased because of the charge remaining on capacitance 32. The resistance presented by diode 38, when in its reverse-biased condition, is quite high, so that the R-C time constant of capacitance 32 and diode 38, at this time, is also quite high. Accordingly, very little charge leaks off of capacitance 32 during the positive rise in voltage across resistance 18.

As voltage across resistance 18 continues to rise, diode 33 becomes forward biased, causing capacitance 35 to acquire a charge. Again, because the resistance of diode 33, when in the forward-biased condition, is quite low, capacitance 35 charges rapidly, following very closely the rise in voltage at the cathode of diode 38. Upon completion of the gradual positive rise of the ramp voltage, amplitude of voltage on the cathode of diode 38 is equal to the peak-to-peak amplitude of ramp voltage produced across resistance 18 due to introduction of a DC component by the action of diode 38 in clamping negative peaks of he ramp voltage waveform to ground or zero.

When the ramp voltage across resistance 18 drops to its maximum negative amplitude, corresponding to flyback of the electron beam in camera pickup tube two, amplitude of voltage at the cathode of diode 38 falls essentially to zero. This is because voltage extant on capacitance 32 at that time is till practically equal to the peak-to-peak amplitude of voltage produced across resistance 18. At this time, since capacitance 35 has likewise been charged to the peak-to-peak amplitude of voltage across resistance 18, diode 33 is no longer in its forward-biased condition. Hence, the R-C time constant for discharge of capacitance 35 is quite high, resulting in amplitude of voltage on capacitance 35 remaining essentially constant at the peak-to-peak amplitude of voltage produced across resistance 18. At this juncture, any charge which may have leaked off of capacitance 32 is replaced by current flow through diode 38, and the negative voltage across resistance 18 begins to rise in a positive direction at a rate determinative of the horizontal sweep velocity of the electron beam in camera pickup tube two.

Immediately prior to attaining the maximum positive voltage across resistance 18, any minute amount of charge which may have leaked off of capacitance 35 is replaced by forward current flow through diode 33. Horizontal flyback of the electron beam in pickup tube two then occurs as a result of an abrupt return of the ramp voltage to its maximum negative value. In this manner, voltage at the second input to differential amplifier 21 is maintained at an essentially constant amplitude substantially equal to the peak-to-peak amplitude of voltage produced across resistance 18.

In similar fashion, amplitude of input voltage furnished to the first input of differential amplifier 21 is maintained substantially equal to the peak-to-peak amplitude of voltage produced across resistance 17 as a result of horizontal sweep current flow through coil 10 in camera pickup tube one. However, while the anode of diode 38 is connected to ground, the anode of diode 37 is connected to the variable tap of size adjust potentiometer 36. This clamps the voltage across resistance 17 to a manually selectable amplitude of zero or a finite amplitude of either polarity, thereby permitting manual adjustment of size of the image produced by pickup tube one. The size of image produced by pickup tube two, which is controlled by adjusting horizontal ramp generator 15 to produce the proper peak-to-peak amplitude of output voltage, thereby constitutes a reference to which the size of image produced by pickup tube one is adjusted. Once this adjustment has been made, output voltage of differential amplifier 21 determines the setting of gain control circuitry 16 so as to control amplitude of current in coil 10 produced by amplifier 12. Thus, once a manual setting of potentiometer 36 has been made so as to establish a uniform horizontal size for rasters generated by camera pickup tubes one and two, no further adjustment need be made to the size control circuitry. Therefore, potentiometer 36 provides facility to compensate for differences in electrical characteristics of the camera pickup tubes due to construction imprecisions, however slight such imprecisions may be.

The output signal from differential amplifier 21, supplied to gain control circuit 16, preferably controls intensity of light directed by lamp 40 onto photoconductive device 41. As intensity of light produced by the lamp varies, conductivity of the photoconductive element varies accordingly. Typically, therefore, differential amplifier 21 produces a steady-state DC output signal of predetermined amplitude when the amplitudes of voltage applied to its first and second inputs are equal. The amplitude of output signal thus produced by differential amplifier 21 is of a level to maintain a predetermined level of illumination by the lamp in gain control circuit 16, so that photoconductive element 40 exhibits a predetermined resistance, permitting horizontal sweep output amplifier 12 to produce a ramp current of predetermined peak-to-peak amplitude.

In event the amplitude of voltage supplied to the first input off differential amplifier 21 exceeds the amplitude of voltage supplied to the second input thereof, amplitude of DC current furnished by differential amplifier 21 to the lamp of gain control circuitry 16 is decreased, causing an increase in resistance of photoconductive element 40. This results in greater attenuation of the horizontal ramp voltage produced by generator 14, so that current furnished to coil 10 by horizontal sweep output amplifier 12 is diminished in peak-to-peak amplitude. Peak-to-peak amplitude of voltage across resistance 17 is consequently decreased, producing a corresponding decrease in amplitude of voltage applied to the first input of differential amplifier 21. On the other hand, if the amplitude of input voltage applied to the second input of differential amplifier 21 should exceed the amplitude of voltage applied to the first input thereof, the amplitude of current supplied to lamp 41 of gain control circuitry 16 is increased, causing an increase in peak-to-peak amplitude of current produced by horizontal sweep output amplifier 12. As a result, peak-to-peak amplitude of voltage across resistance 17 increases, causing an increase in amplitude of voltage applied to the first input of differential amplifier 21 so as to substantially equalize the amplitudes of voltage supplied to the first and second inputs of differential amplifier 21. In this fashion, therefore, negative feedback is furnished by differential amplifier 21 to gain control circuit 16 so as to maintain the size of image produced by the camera one pickup tube equal to the size of image produced by the camera two pickup tube by controlling current through coil 10 in accordance with the output signal produced by differential amplifier 21. Typically, differential amplifier 21 comprises a Motorola operational amplifier, type MC 1456 G, available from Motorola, Inc., having offices in Franklin Park, Illinois.

While the foreoing discussion has been directed to correction of size and centering in the horizontal direction, the invention contemplates employment of the same type of circuitry in correcting size and centering in the vertical direction. However, sizes of the circuit components employed in the vertical correction circuitry differe from those employed in the horizontal correction circuitry since the rates at which the electron beam of each pickup tube is moved in the vertical direction differs from the rates at which it is moved in the horizontal direction.

Figure 2:
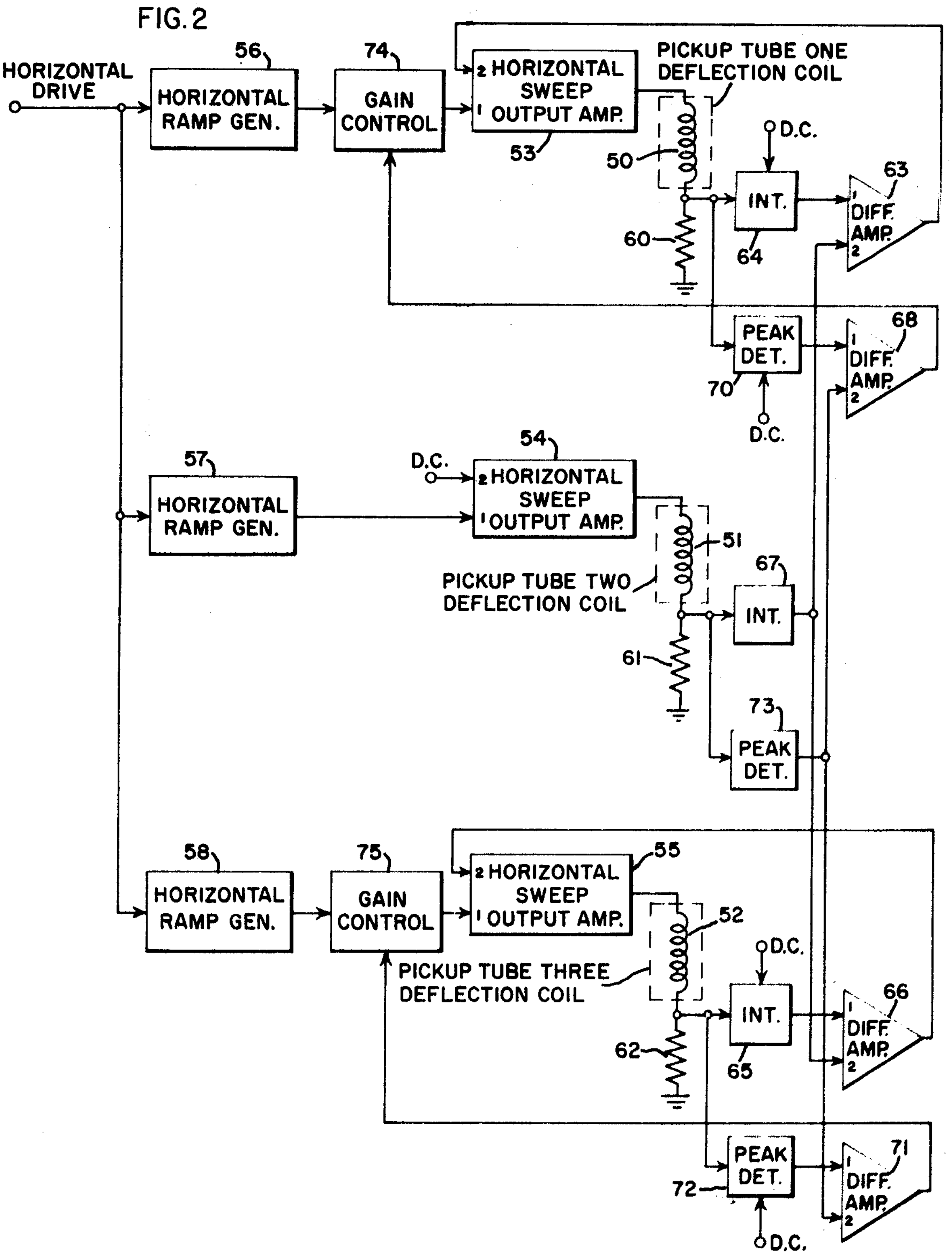
FIG. 2 is a block diagram of apparatus embodying the invention in a three-tube color camera.

FIG. 2 illustrates the invention, in block diagram form, as applied to a three-tube color camera. Again, for simplicity, only the horizontal correction circuitry is shown. Thus, the horizontal deflection yoke coils 50, 51 and 52 of each respective pickup tube in a three-tube color camera are driven by horizontal sweep output amplifiers 53, 54 and 55, respectively, in conventional fashion. That is, each of horizontal sweep amplifiers 53, 54 and 55 receives at a first input thereof an AC sawtooth wave produced by respective horizontal ramp generators 56, 57 and 58, with gain control elements 74 and 75 interposed between ramp generator 56 and amplifier 53 and between ramp generator 58 and amplifier 55, respectively. A predetermined bias is applied to a second input of horizontal sweep output amplifier 54 so as to maintain the DC component of the sawtooth wave produced by amplifier 54 at a desired image centering amplitude for the second pickup tube of the camera. Horizontal ramp generators 56, 57 and 58 are triggered synchronously by a common horizontal drive signal.

Each of coils 50, 51 and 52 is connected to one side of a resistance 60, 61 and 62, respectively. These resistances are highly stable, preferably with variations of only one part per million per degree centrigrade, such as the aforementioned one-half watt precision resistors, type S-104, available from Vishay Instruments, Inc. The opposite side of each of resistances 60, 61 and 62 is grounded, enabling currents in yoke coils 50, 51 and 52 to be sampled across resistances 60, 61 and 62, respectively.

A first input of a differential amplifier 63 is DC coupled through an R-C filter or integrator circuit 64 to the junction of coil 50 and resistance 60. Similarly, a first input of a second differential amplifier 66 is coupled through an R-C filter or integrator circuit 65 to the junction of coil 52 and resistance 62. The second inputs of both of differential amplifiers 63 and 66 are coupled through an R-C filter or integrator circuit 67 to the junction of coil 51 and resistance 61. A first input of a third differential amplifier 68 is coupled through a peak detector 70 to the junction of coil 50 and resistance 60, while a first input of a fourth differential amplifier 71 is coupled through a peak detector 72 to the junction of coil 52 and resistance 62. The second input of both of differential amplifiers 68 and 71 are coupled through a peak detector 73 to the junction of coil 51 and resistance 61. Thus, the AC components of voltage resulting from flow of alternating current in coils 50, 51 and 52 through resistances 60, 61 and 62, respectively, are filtered out of the first input to amplifier 63 by integrator circuit 64, are filtered out of the second inputs to each of amplifiers 63 and 66 by integrator circuit 67, and are filtered out of the first input to amplifier 66 by integrator circuity 65, respectively. Similarly, a DC potential of amplitude dependent upon the peak-to-peak amplitude of voltage across resistances 60, 61 and 62, respectively, is supplied to the first input of amplifier 68 by peak detector 70, is supplied to the second inputs of each of amplifiers 68 and 71 by peak detector 73, and is supplied to the first input of amplifier 71 by peak detector 72, respectively. Each of amplifiers 63, 68, 66 and 71 preferably comprises an integrated circuit.

Output signals from differential amplifiers 63 and 66 are supplied to second inputs of amplifiers 53 and 55, respectively, in negative feedback fashion in order to maintain the DC components of the sawtooth wave produced by each of amplifiers 53 and 55, respectively, at the desired centering amplitude for each of the first and third pickup tubes, respectively, of the camera. The output of each of differential amplifiers 68 and 71 furnishes a control signal to each of gain control elements 74 and 75, respectively.

In operation, deflection coil currents of camera pickup tubes one and three are compared to deflection coil current of camera pickup tube two in order to derive DC error voltages for centering and size. Centering error voltages are applied to the second inputs of the sweep output amplifiers driving pickup tubes one and three, and in a direction when tends to minimize the difference in average amplitude of coil current in each of pickup tubes one and two, and pickup tubes three and two, respectively. Size error voltages are applied to each of gain control elements 74 and 75 in a direction which tends to minimize the difference in peak-to-peak amplitude of coil current in each of pickup tubes one and two, and pickup tubes three and two, respectively.

Centering differences are minimized by applying voltages caused by flow of yoke coil currents in pickup tubes one, two and three, respectively, to the inputs of integrator circuits 64, 67 and 65, respectively. With the AC components of the ramp voltages across resistances 60, 61 and 62 filtered out by the R-C filters comprising integrator circuits 64, 67 and 65, signals furnished to the first input of differential amplifier 63, the second inputs of differential amplifiers 63 and 66, and the first input of differential amplifier 66, respectively, are comprised only of the DC portions, if any, of the ramp voltage waveforms resulting from current produced by horizontal ramp generators 56, 57 and 58 respectively. These voltage waveforms are highly accurate represenations of the respective yoke coil currents from which they are derived due, in large measure, not only to the high degree of precision of resistances 60, 61 and 62, but also to the matched drift of the signals in the first and second input circuits of each of differential amplifiers 63, 68, 66 and 71, each of which amplifiers is formed on a separate semiconductor chip, respectively.

In event the average amplitudes of currents in coils 50 and 51 are equal, differential amplifier 63 furnishes no output voltage to the second input of horizontal sweep output amplifier 53. On the other hand, if average current in coil 50 is more negative than that in coil 51, the magnitude of voltage supplied to the first input of differential amplifier 63 is below that supplied to the second input of amplifier 63. In this event, differential amplifier 63 furnishes a voltage of positive polarity to the second input of horizontal sweep output amplifier 53, with amplitude dependent upon the difference in amplitude of currents through coils 50 and 51. This voltage adds to the output signal of horizontal sweep output amplifier 53, increasing in a positive direction the average amplitude of the ramp voltage waveform furnished by amplifier 53 and thereby increasing in a positive direction the average amplitude of current flowing through coil 50. This serves to minimize the difference between center locations of images detected by pickup tubes one difference two. On the other hand, in event the average current through coil 50 is more positive than that in coil 51, the DC error voltage produced by differential amplifier 63 reverses polarity and assums an amplitude dependent upon the difference in amplitude of current flowing through coils 50 and 51. Differential amplifier 63 thus supplies a voltage of negative polarity to the second input of horizontal sweep output amplifier 53 and thereby increases in a negative direction the average amplitude of the ram voltage waveform furnished by amplifier 53, increasing in a negative direction the average amplitude of current flowing through coil 50. Again, this serves to minimize the difference between center locations of images detected by camera pickup tubes one and two.

Amplitude of current flow through coil 51 may be manually adjusted by regulating the amplitude of DC voltage applied to the second input of horizontal sweep output amplifier 54. In this fashion, average current in the yoke coils of each of camera pickup tubes one and two is adjusted so as to produce identical image centering for both tubes. By making the voltage gain of differential amplifier 63 relatively high (about 40,000), correction for miscentering of images produced by pickup tubes one and two comes very close to being 100 percent.

In a manner similar to that just described, the DC components of ramp voltage in the yoke coils of pickup tubes two and three may also be adjusted so as to produce idential image centering for both tubes. Again, by making the voltage gain of differential amplifier 66 relatively high (about 40,000), correction for miscentering of images produced by pickup tubes two and three likewise comes very close to being 100 percent. In matching the centers of images produced by pickup tubes two and three, the amplitude of current in coil 51, once having been manually adjusted in order to match the centers of images produced by pickup tubes one and two, is not readjusted; otherwise, a change in centering for both pickup tubes one and three would occur, since the output signal from amplifier 54 is furnished to both differential amplifiers 63 and 66. Vertical centering adjustments are made in a manner similar to the horizontal centering adjustments described in conjunction with FIG. 2, with the exception that component sizes are different in some respects in order to sweep the electron beam in a vertical direction at different rates than in a horizontal direction.

Minimization of size differences depends on application of DC voltage proportional to the peak-to-peak ramp voltage urnished to pickup tubes one, two and three, to the first input of differential amplifier 68, the second inputs of differntial amplifiers 68 and 71, and the first input of differntial amplifier 71, respectively. This is accomplished by supplying voltages proportional to the yoke coil currents in pickup tubes one, two and three, respectively, to voltage peak-to-peak detectors 70, 73 and 72, respectively. Since a difference in peak-to-peak amplitude of the voltage waveforms generated by the camera yoke coil currents produces a a difference in length of horizontal sweep, a difference in horizontal size of detected images results. Accordingly, peak-to-peak detectors 70, 73 and 72, respectively, function to convert the ramp voltage waveforms resulting from flow of yoke coil current through each of resistances 60, 61 and 62, respectively, to a substantially steady-state DC voltage of amplitude proportional to the peak-to-peak amplitude of the voltage from which it was produced.

Specifically, considering the voltage waveform configuration produced by flow of current from coil 50 of camera one as an example, a ramp voltage having an average amplitude at or close to zero appears across resistance 60. This ramp voltage waveform configuration is such that the function common to resistance 60 and coil 50 initially drops sharply to a negative voltage, from which it begins to rise at a rate determinative of the velocity at which the electron beam in camera pickup tube one is swept horizontally. Upon completion of the gradual positive rise of the ramp voltage, amplitude of voltage at the output of peak-to-peak detector 70 is equal to the peak-to-peak amplitude of ramp voltage produced across resistance 60. When the ramp voltage across resistance 60 next drops to its maximum negative amplitude, corresponding to flyback of the electron beam in camera pickup tube one, amplitude of voltage at the output of peak-to-peak detector 70 remains essentially constant at the peak-to-peak amplitude of voltage produced across resistance 60. At this juncture, the negative voltage across resistance 60 again begins to rise in a positive direction at a rate determinative of the horizontal sweep velocity of the electron beam in camera pickup tube one. With appropriately large peak detector circuit time constants, the voltage at the first input to differential amplifier 68 is maintained at an essentially constant amplitude substantially equal to the peak-to-peak amplitude of voltage produced across resistance 60.

In similar fashion, amplitude of input voltage furnished to the second input of each of differential amplifiers 68 and 71 is maintained substantially equal to the peak-to-peak amplitude of voltage produced across resistance 61 as a result of horizontal sweep current flow through coil 51 in camera pickup tube two. The output signal from differential amplifier 68, supplied to gain control circuit 74, controls signal attenuation between the output of horizontal ramp generator 56 and the first input to horizontal sweep output amplifier 53. Typically, therefore, differential amplifier 68 produces a steady-state DC output signal of predetermined amplitude when the amplitudes of voltage applied to its first and second inputs are equal. The amplitude of output signal thus produced by differential amplifier 68 is of a level to maintain a predetermined amount of attention introduced by gain control circuit 74, permitting horizontal sweep output amplifier 53 to produce a ramp current of predetermined peak-to-peak amplitude.

In event the amplitude of voltage supplied to the first input of differential amplifier 68 exceeds the amplitude of voltage supplied to the second input thereof, amplitude of DC current furnished by differential amplifier 68 to gain control circuit 74 is decreased, causing an increase in attentuation between the output of horizontal ramp generator 56 and the first input of horizontal sweep output amplifier 53. As a result, current furnished to coil 50 by horizontal sweep output amplifier 53 is diminished in peak-to-peak amplitude. Peak-to-peak amplitude of voltage across resistance 60 is consequently decreased, producing a corresponding decrease in amplitude of voltage applied to the first input of differential amplifier 68.

On the other hand, if the amplitude of input voltage applied to the second input of differential amplifier 68 should exceed the amplitude of voltage applied to the first input thereof, the amplitude of current supplied to gain control circuit 74 is increased. This decreases the amount of attenuation introduced by gain control circuit 74, causing an increase in peak-to-peak amplitude of current produced by horizontal sweep output amplifier 53. As a result, peak-to-peak amplitude of voltage across resistance 60 incrrases, causing an increase in amplitude of voltage applied to the first input of differential amplifier 68 so as to substantially equalize the amplitudes of voltage supplied to the first and second inputs of differential amplifier 68. In this fashion, therefore, negative feedback is furnished by differential amplifier 68 to gain control circuit 74 so as to maintain the size of image produced by the camera one pickup tube equal to the size of image produced by the camera two pickup tube by controlling current through coil 60 in accordance with the output signal produced by differential amplifier 68.

In similar fashion, negative feedback furnished by differential amplifier 71 to gain control circuit 75 maintains the size of image produced by the camera three pickup tube also equal to the size of image produced by the camera two pickup tube by controlling current through coil 52 in accordance with the output signal produced by differential amplifier 71. Typically, differential amplifiers 68 and 71 comprise Motorola operational amplifiers, type MC 1456G, available from Motorola, Inc., having offices in Franklin Park, Ill.

While the foregoing discussion regarding the circuitry of FIG. 2 has been directed to correction of size and centering in the horizontal direction, the invention contemplates employment of the same type of circuitry in correcting size and centering in the vertical direction. However, some sizes of circuit components employed in the vertical correction circuitry differ from those employed in the horizontal correction circuitry since the rates at which the electron beam of each pickup tube is moved in the vertical direction differs from the rates at which it is moved in the horizontal direction.

The foregoing describes a method and apparatus for improving long term registration stability in television color cameras by maintaining images produced by the pickup tubes substantially centered upon each other and substantially of identical size. The invention is applicable in multiple tube television color cameras to minimize differential changes in sweep size and centering, both in the horizontal and vertical directions.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. Apparatus for maintaing long term centering stability of images in a multiple pickup tube color television camera, each tube including electron beam deflection means, said camera including ramp signal-generating means coupled to each said deflection means, respectively, to control the sweep of an electron beam in a single one of substantially mutually perpendicular directions, said apparatus comprising:

sensing means coupled to said deflection means of each of the tubes of said camera for sensing current sweeping the beam in each of said tubes, respectively, in said single direction, each of said sensing means producing an output signal of amplitude dependent substantially upon the average amplitude of each ramp signal waveform produced by the respective ramp signal-generating means coupled thereto;

comparison means coupled to each of said sensing means for producing output signals in accordance with differences between amplitudes of signal produced by said sensing means coupled to each one of a pair of said tubes; and means coupling said comparison means to different ones of all but one of said ramp signal-generating means so as to combine each of said output signals produced by said comparison means with the ramp signal waveforms produced by all but said one of said ramp signal-generating means, respectively.

2. The apparatus of claim 1 wherein each of said sensing means comprises an integrating circuit having a time constant at least two orders of magnitude greater than the period of the ramp signal produced by said respective ramp signal-generating means coupled thereto.

3. The apparatus of claim 1 wherein each of said sensing means includes resistance means connected in series between each of said deflection means, respectively, and a separate input, respectively, of said comparison means, and further includes capacitance means connected in shunt with each of said inputs, respectively, of said comparison means.

4. The apparatus of claim 1 wherein said each tube includes additional electron beam deflection means, and said camera further includes additional ramp signal-generating means for controlling the sweep of said electron beam in said each tube in the second one of saud substantially mutually perpendicular directions so as to enable said beam to repetitively traverse substantially rectangular rasters, and means coupling said additional ramp signal-generating means to each said additional deflection means, said apparatus further comprising:

additional sensing means coupled to said additional deflection means of each of said tubes for sensing current sweeping the beam in each of said tubes, respectively, in said second direction, each of said additional sensing means producing an output signal of amplitude dependent substantially upon the average amplitude of each ramp signal waveform produced by the respective additional ramp signal-generating means coupled thereto;

additional comparison means coupled to each of said additional sensing means for producing output signals in accordance with differences between amplitudes of signal produced by said additional sensing means coupled to each one of a pair of said tubes; and means coupling said additional comparison means to different ones of all but one of said additional ramp signal-generating means, respectively, so as to combine each of said output signals produced by said additional comparison means with the ramp signal waveforms produced by all but said one of said additional ramp signal-generating means, respectively.

5. The apparatus of claim 4 wherein each said sensing means comprises an integrating circuit having a time constant at least two orders of magnitude greater than the period of the ramp signal produced by the respective ramp signal-generating means coupled thereto.

6. Apparatus for maintaining long-term size stability of images in a multiple pickup tube color television camera, each tube including electron beam deflection means, said camera including ramp signal-generating means for controlling the sweep of an electron beam in a single one of substantially mutually perpendicular directions, and means coupling one of said ramp signal-generating means to one of said deflection means, said apparatus comprising:

sensing means coupled to said deflection means of each of the tubes of said camera for sensing current sweeping said beam in said single direction in each of said tubes, respectively, each of said sensing means producing an output signal of amplitude dependent substantially upon the peak-to-peak amplitude of each signal waveform respectively furnished thereto;

comparison means coupled to each of said sensing means for producing output signals in accordance with differences between amplitudes of signal produced by said sensing means coupled to each one of a pair of said tubes;

gain control means coupling each of the other ones of said ramp signal generating means, respectively, to each of the other ones of said deflection means, respectively, for controlling peak-to-peak amplitude of the ramp signal furnished to each of said other ones of said deflection means, respectively; and means coupling said comparison means to each of said gain control means so as to enable each said gain control means to regulate peak-to-peak amplitude of ramp signal waveforms respectively furnished thereto in accordance with said output signals produced by said comparison means respectively coupled thereto.

7. The apparatus of claim 6 wherein each of said sensing means comprises first capacitor means, first diode means in series with said first capacitor means and a separate input of said comparison means, second capacitor means in shunt with said separate input of said comparison means, and second diode means connected to the junction of said first capacitor means and said first diode means for clamping to a predetermined DC potential one point of discontinuity of the ramp signal waveform furnished to said each of said sensing means.

8. The apparatus of claim 7 wherein said each tube includes additional electron beam deflection means, and said camera further includes additional ramp signal-generating means for controlling the sweep of said electron beam in the second one of said substantially mutually perpendicular directions so as to enable said beam to repetitively traverse substantially rectangular reasters, and means coupling one of said additional ramp signal generating means to one of said additional deflection means, said apparatus further comprising:

additional sensing means coupled to said additional deflection means of each of the tubes of said camera for sensing current sweeping said beam in the second one of said directions in each of said tubes, respectively, each of said additional sensing means producing an output signal of amplitude dependent substantially upon peak-to-peak amplitude of each signal waveform respectively furnished thereto;

additional comparison means coupled to each of said additional sensing means for producing output signals in accordance with differences between amplitudes of signal produced by said additional sensing means coupled to each one of a pair of said tubes;

additional gain control means coupling each of the other ones of said additional ramp signal generating means, respectively, to each of the other ones of said additional deflection means, respectively, for controlling peak-to-peak amplitude of the ramp signal furnished to each of said other ones of said additional deflection means, respectively; and means coupling said additional comparison means to each of said additional gain control means so as to enable each said additional gain control means to regulate peak-to-peak amplitude of ramp signal waveforms respectively furnished thereto in accordance with said output signals produced by said additional comparison means respectively coupled thereto.

9. The apparatus of claim 8 wherein each of said sensing means comprises first capacitor means, first diode means in series with said first capacitor means and a separate input of said comparison means, second capacitor means in shunt with said separate input of said comparison means, and second diode means connected to the junction of said first capacitor means and said first diode means for clamping to a predetermined DC potential one point of discontinuity of the ramp signal waveform furnished to said each of said sensing means.

10. Apparatus for maintaining long-term registration stability of images in a multiple pickup tube color television camera, each tube including electron beam deflection means, said camera including ramp signal-generating means for controlling the sweep of an electron beam in a single one of substantially mutually perpendicular directions, and means coupling one of said ramp signal-generating means to one of said deflection means, said apparatus comprising:

first sensing means coupled to said deflection means of each of the tubes of said camera for sensing current sweeping the beam in each of said tubes, respectively, in said single direction, each of said first sensing means producing an output signal of amplitude dependent substantially upon the average amplitude of each ramp signal waveform furnished thereto;

second sensing means coupled to said deflection means of each of said tubes for sensing current sweeping said beam in each of said tubes, respectively, in said single direction, each of said second sensing means producing an output signal of amplitude dependent substantially upon the peak-to-peak amplitude of each signal waveform respectively furnished thereto;

first comparison means coupled to each of said first sensing means for producing output signals in accordance with differences between amplitudes of signal producd by said first sensing means coupled to each one of a pair of said tubes;

second comparison means coupled to each of said second sensing means for producing output signals in accordance with differences between amplitudes of signal produced by said second sensing means coupled to each one of said pair of tubes;

means coupling said first comparison means to different ones of all but said one of said ramp signal generating means so as to algebraically combine each of said output signals produced by said first comparison means with the ramp signal waveforms produced by said different ones of all but said one of said ramp signal-generating means, respectively;

gain control means coupling each of the other ones of said ramp signal-generating means, respectively, to each of the other ones of said deflection means, respectively, for controlling peak-to-peak amplitude of the ramp signal furnished to each of said other ones of said deflection means, respectively; and means coupling said second comparison means to each of said gain control means so as to enable each said gain control means to regulate peak-to-peak amplitude of ramp signal waveforms respectively furnished thereto in accordance with said output signals produced by said second comparison means respectively furnished thereto.

11. The apparatus of claim 10 wherein each of said first sensing means comprises an integrating circuit having a time constant at least two orders of magnitude greater than the period of the ramp signal produced by said respective ramp signal generating means coupled thereto, and each of said second sensing means includes first capacitor means, first diode means in series with said first capacitor means and a separate input of said second comparison means, second capacitor means in shunt with said separate input of said second comparison means, and second diode means connected to the junction of said first capacitor means and said first diode means for clamping to a predetermined DC potential one point of discontinuity of the ramp signal waveform furnished to said each of said sensing means.

12. A method of maintaining long-term registration stability in a multiple pickup tube color television camera, each tube-receiving ramp waveform deflection signals for deflecting an electron beam therein substantially in mutually perpendicular directions so as to enable said beam to repetitively traverse substantially rectangular rasters, said method comprising:

comparing the deflection signals deflecting the electron beam in each of a pair of the tubes in at least one of said directions to produce a first error voltage of amplitude dependent upon the difference in average amplitude of each of said signals, and a second error voltage of amplitude dependent upon the difference in peak-to-peak amplitudes of each of said signals; and correcting the deflection signal in one tube of said pair in accordance with said first and second error voltages, respectively, so as to maintain each of the average and peak-to-peak amplitudes of said deflection signal in said one tube at a substantially constant relation with respect to the average and peak-to-peak amplitudes of said deflection signal, respectively, in another tube of said pair.

UNITED STATES PATENT OFFICE

CERTIFICATE OF CORRECTION

Patent No. 3,609,219 Dated September 28, 1971

Inventor(s) Max H. Diehl

It is certified that error appears in the above-identified patent and that said Letters Patent are hereby corrected as shown below:

Column 3, line 41, cancel "on" and insert -- one. Column 6, line 17, cancel "off" and insert -- of --; line 55, cancel "differe" and insert -- differ --. Column 7, line 57, cancel "when" and insert -- which --. Column 8, line 3, cancel "represenations" and insert -- representations --; line 28, cancel "difference" and insert -- and --; line 74, cancel "urnished" and insert -- furnished --. Column 9, line 1, cancel "differntial" and insert -- differential --; line 20, cancel "function" and insert -- junction --; line 58, cancel "attention" and insert -- attenuation --. Column 10, line 6, cancel "incrrases" and insert -- increases --; line 52, cancel "maintaing" and insert -- maintaining --. Column 11, line 19, cancel "saud" and insert -- said --. Column 14, line 17, cancel the hyphen at the end of the line.

Signed and sealed this 27th day of June 1972.

(SEAL)
Attest:

EDWARD M.FLETCHER,JR.
Attesting Officer

ROBERT GOTTSCHALK
Commissioner of Patents